(12) United States Patent
Perkins et al.

(10) Patent No.: US 9,032,794 B2
(45) Date of Patent: May 19, 2015

(54) PITCHER TRAINING APPARATUS AND METHOD USING A BALL WITH AN EMBEDDED INERTIAL MEASUREMENT UNIT

(75) Inventors: Noel Perkins, Ann Arbor, MI (US); Ryan McGinnis, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 214 days.

(21) Appl. No.: 13/570,622

(22) Filed: Aug. 9, 2012

(65) Prior Publication Data

US 2014/0045630 A1 Feb. 13, 2014

(51) Int. Cl.
*G01P 15/00* (2006.01)
*G01P 1/00* (2006.01)
*G01P 3/00* (2006.01)
*A63B 69/00* (2006.01)
*A63B 43/00* (2006.01)
*G01C 19/42* (2006.01)
*G01P 1/02* (2006.01)

(52) U.S. Cl.
CPC ............... *A63B 43/00* (2013.01); *G01C 19/42* (2013.01); *G01P 1/02* (2013.01); *A63B 69/00* (2013.01)

(58) Field of Classification Search
USPC ................... 73/493, 491, 494–495, 498–499, 73/510–511; 473/409, 219, 221–226, 473/288–290, 256–258, 231–233
See application file for complete search history.

(56) References Cited

U.S. PATENT DOCUMENTS

| | | | |
|---|---|---|---|
| 4,601,206 A | 7/1986 | Watson | |
| 4,759,219 A | 7/1988 | Cobb et al. | |
| 5,548,999 A | 8/1996 | Kakizaki et al. | |
| 5,694,340 A | 12/1997 | Kim | |
| 6,073,086 A | 6/2000 | Marinelli | |
| 6,128,955 A | 10/2000 | Mimura | |
| 6,148,271 A | 11/2000 | Marinelli | |
| 6,151,563 A | 11/2000 | Marinelli | |
| 6,157,898 A | 12/2000 | Marinelli | |
| 6,195,261 B1 | 2/2001 | Babutzka et al. | |
| 6,301,964 B1 | 10/2001 | Fyfe et al. | |
| 6,725,719 B2 | 4/2004 | Cardarelli | |
| 6,836,744 B1* | 12/2004 | Asphahani et al. | ........... 702/141 |
| 7,021,140 B2 | 4/2006 | Perkins | |
| 7,234,351 B2 | 6/2007 | Perkins | |
| 7,237,446 B2* | 7/2007 | Chan et al. | ................... 73/865.4 |
| 7,536,909 B2 | 5/2009 | Zhao et al. | |
| 7,628,074 B2* | 12/2009 | Vannucci et al. | ............... 73/597 |
| 7,814,791 B2 | 10/2010 | Andersson et al. | |
| 7,849,740 B2 | 12/2010 | Nichol | |

(Continued)

FOREIGN PATENT DOCUMENTS

JP 2008038418 A 2/2008

OTHER PUBLICATIONS

Alaways, L. and Hubbard, M., "Experimental determination of baseball spin and lift," *Journal of Sports Sciences*, (May 2001), vol. 19, No. 5, pp. 349-358.

(Continued)

*Primary Examiner* — Helen Kwok
(74) *Attorney, Agent, or Firm* — Harness, Dickey & Pierce, P.L.C.

(57) ABSTRACT

A measurement system having a miniature, wireless inertial measurement unit (IMU) disposed within or on a moving object, such as a ball or other member, to calculate the kinematics of the moving object.

18 Claims, 5 Drawing Sheets

(56) References Cited

U.S. PATENT DOCUMENTS

| | | | |
|---|---|---|---|
| 7,907,838 | B2 | 3/2011 | Nasiri et al. |
| 7,938,004 | B1 | 5/2011 | Brunsch, Jr. et al. |
| 8,001,839 | B2 | 8/2011 | Sugihara et al. |
| 8,042,391 | B2 | 10/2011 | Ye |
| 8,156,806 | B1 | 4/2012 | Cardarelli |
| 8,186,217 | B2 | 5/2012 | Veltink |
| 8,209,147 | B2* | 6/2012 | Solinsky ............... 702/160 |
| 8,250,921 | B2 | 8/2012 | Nasiri et al. |
| 8,616,989 | B2* | 12/2013 | Bentley ............... 473/215 |
| 8,668,595 | B2* | 3/2014 | Boyd et al. ............... 473/223 |
| 2002/0040601 | A1 | 4/2002 | Fyfe et al. |
| 2002/0077189 | A1* | 6/2002 | Tuer et al. ............... 473/151 |
| 2003/0023192 | A1 | 1/2003 | Foxlin |
| 2003/0070483 | A1 | 4/2003 | Mueller |
| 2003/0149528 | A1 | 8/2003 | Lin |
| 2005/0081629 | A1 | 4/2005 | Hoshal |
| 2005/0143949 | A1 | 6/2005 | Hagstedt |
| 2006/0042382 | A1 | 3/2006 | DCamp et al. |
| 2006/0062382 | A1 | 3/2006 | Ronkainen |
| 2006/0161363 | A1 | 7/2006 | Shibasaki et al. |
| 2006/0185431 | A1 | 8/2006 | Birecki et al. |
| 2006/0185432 | A1 | 8/2006 | Weinberg |
| 2006/0230829 | A1 | 10/2006 | Byrd |
| 2006/0287085 | A1 | 12/2006 | Mao et al. |
| 2007/0039387 | A1 | 2/2007 | Jouanet et al. |
| 2007/0169551 | A1 | 7/2007 | Kelly |
| 2008/0176681 | A1 | 7/2008 | Donahoe |
| 2008/0196499 | A1 | 8/2008 | Li et al. |
| 2008/0255795 | A1 | 10/2008 | Shkolnikov |
| 2008/0285805 | A1 | 11/2008 | Luinge et al. |
| 2009/0048044 | A1 | 2/2009 | Oleson et al. |
| 2009/0255335 | A1 | 10/2009 | Fly et al. |
| 2009/0262074 | A1 | 10/2009 | Nasiri et al. |
| 2009/0325739 | A1 | 12/2009 | Gold |
| 2010/0030482 | A1 | 2/2010 | Li |
| 2010/0053331 | A1 | 3/2010 | Accurso |
| 2010/0089155 | A1 | 4/2010 | Sugihara et al. |
| 2010/0184563 | A1* | 7/2010 | Molyneux et al. ............... 482/1 |
| 2010/0211317 | A1 | 8/2010 | Kroepfl et al. |
| 2011/0077891 | A1 | 3/2011 | Koenig |
| 2011/0118065 | A1 | 5/2011 | Krysiak et al. |
| 2011/0313552 | A1 | 12/2011 | Davenport |
| 2012/0004882 | A1 | 1/2012 | Sheynblat |
| 2012/0078570 | A1 | 3/2012 | Rothkopf et al. |
| 2012/0271565 | A1 | 10/2012 | Berme et al. |
| 2012/0277015 | A1* | 11/2012 | Boyd et al. ............... 473/223 |
| 2012/0296601 | A1 | 11/2012 | Eatwell |
| 2013/0029791 | A1* | 1/2013 | Rose et al. ............... 473/409 |
| 2013/0068017 | A1* | 3/2013 | Perkins et al. ............... 73/504.02 |
| 2013/0073247 | A1* | 3/2013 | Perkins et al. ............... 702/141 |
| 2013/0073248 | A1 | 3/2013 | Perkins et al. |
| 2014/0045630 | A1 | 2/2014 | Perkins et al. |

OTHER PUBLICATIONS

Alaways, L., Mish, S. and Hubbard, M., "Identification of release conditions and aerodynamic forces in pitched-baseball trajectories," *Journal of Applied Biomechanics*, (Feb. 2001), vol. 17, No. 1, pp. 63-76.

Bahill, A.T., and Baldwin, D.G., "Describing baseball pitch movement with right-hand rules," *Computers in Biology and Medicine*, (Jul. 2007), vol. 37, No. 7, pp. 1001-1008.

Dillman, C., Fleisig, G., and Andrews, J., "Biomechanics of Pitching with Emphasis upon Shoulder Kinematics," *Journal of Orthopaedic & Sports Physical Therapy*, (Aug. 1993), vol. 18, No. 2, pp. 402-408.

Feltner, M. and Dapena, J., "Dynamics of the Shoulder and Elbow Joints of the Throwing Arm During a Baseball Pitch," *International Journal of Sport Biomechanics*, (Nov. 1986), vol. 2, No. 4, pp. 235-259.

Fleisig, G., Barrentine, S., Zheng, N., Escamilla, R., and Andrews, J., "Kinematic and kinetic comparison of baseball pitching among various levels of development," *Journal of Biomechanics*, (Dec. 1999), vol. 32, No. 12, pp. 1371-1375.

Fleisig, G. S., Bolt, B., Fortenbaugh, D., Wilk, K. E., and Andrews, J. R., "Biomechanical Comparison of Baseball Pitching and Long-Toss: Implications for Training and Rehabilitation," *Journal of Orthopaedic & Sports Physical Therapy*, (May 2011), vol. 41, No. 5, pp. 296-303.

Jinji, T. and Sakuri, S., "Throwing arm motion to determine spin axis of pitched baseball," presented at the XXIV ISBS Symposium, Salzburg, Austria, 2006.

King, K. W., "The design and application of wireless MEMS inertial measurement units for the measurement and analysis of golf swings," University of Michigan, Ann Arbor, MI, (2008), 150 pages.

King, K., Yoon, S. W., Perkins, N. C., and Najafi, K., "Wireless MEMS inertial sensor system for golf swing dynamics," *Sensors and Actuators A: Physical*, (Feb. 15, 2008), vol. 141, No. 2, pp. 619-630.

Koda, H., Sagawa, K., Kuroshima, K., Tsukamoto, T., Urita, K., and Ishibashi, Y., "3D Measurement of Forearm and Upper Arm during Throwing Motion Using Body Mounted Sensor," *Journal of Advanced Mechanical Design Systems and Manufacturing*, (2010), vol. 4, No. 1, pp. 167-178.

Lapinski, M., Berkson, E., Gill, T., Reinold, M., and Paradiso, J. A., "A Distributed Wearable, Wireless Sensor System for Evaluating Professional Baseball Pitchers and Batters," 2009 *International Symposium on Wearable Computers, Proceedings*, Los Alamitos: IEEE Computer Soc., (2009), pp. 131-138.

Nathan, A. M., "The effect of spin on the flight of a baseball," *American Journal of Physics*, (Feb. 2008), vol. 76, No. 2, pp. 119-124.

Sakuri, S., Ikegami, Y., Okamoto, A., Yabe, K., and Toyoshima, S., "A three-dimensional cinematographic analysis of upper limb movement during fastball and curveball baseball pitches," *Journal of Applied Biomechanics*, (1993), vol. 9, pp. 47-65.

Simo, J. C., Tarnow, N., and Doblare, M. "Non-linear dynamics of three-dimensional rods: Exact energy and momentum conserving algorithms," *International Journal for Numerical Methods in Engineering*, (May 1995), vol. 38, No. 9, pp. 1431-1473.

Theobalt, C., Albrecht, I., Haber, J., Magnor, M., and Seidel, H.P., "Pitching a baseball: tracking high-speed motion with multi-exposure images," *ACM Trans. Graph.*, (Aug. 2004), vol. 23, No. 3, pp. 540-547.

Anderson, D., Perkins, N.C., and Richards, B., "Quantitative understanding of the fly casting stroke through measurements and robotic casting," (Jun. 2006), Sports Engineering, vol. 9, Issue 2, pp. 97-106.

Berkson, E., Aylward, R., Zachazewski, J., Paradiso, J., and Gill, T., "IMU Arrays: The Biomechanics of Baseball Pitching," The Orthopaedic Journal at Harvard Medical School, (Nov. 2006), vol. 8, pp. 90-94.

Cloete, T., and Scheffer, C., "Benchmarking of a full-body inertial motion capture system for clinical gait analysis," 30th Annual International IEEE EMBS Conference, Vancouver, British Columbia, Canada, (Aug. 20-24, 2008), pp. 4579-4582.

Costello, Mark et al., Determining Angular Velocity and Angular Acceleration of Projectiles Using Triaxial Acceleration Measurements, Journal of Spacecraft and Rockets, Jan.-Feb. 2002, vol. 39, No. 1, p. 73-80.

King, K.W., and Perkins, N.C., "Putting Stroke Analysis Using Wireless MEMS Inertial Sensor System," (2008), World Scientific Congress on Golf V, Phoenix, AZ, pp. 270-278.

Krishnan, V., Measurement of Angular Velocity and Linear Acceleration Using Linear Accelerometers, Journal of the Franklin Institute, vol. 280, No. 4, Oct. 1965, pp. 307-315.

Mayagoitia, R., Nene, A., Veltink, P., "Accelerometer and rate gyroscope measurement of kinematics: an inexpensive alternative to optical motion analysis systems," (2002), Journal of Biomechanics, vol. 35, pp. 537-542.

Perkins, N., and Richards, B., "Understanding Your Casting Stroke," Fly Fisherman, (Dec. 2003), pp. 34-37 and 66.

Randolph, J., "Casting in the Groove," Fly Fisherman, (Dec. 2003), p. 6.

Roetenberg, D., Luinge, H., and Slycke, P., "Xsens MVN: Full 6DOF Human Motion Tracking Using Miniature Inertial Sensors," XSENS Technologies, (Apr. 2009), pp. 1-7.

(56) References Cited

OTHER PUBLICATIONS

Search Report and Written Opinion for PCT/US2013/053556, mailed Dec. 17, 2013.
Zhou, H., Stone, T., Hu, H. and Harris, N., "Use of multiple wearable inertial sensors in upper limb motion tracking," (2008), Medical Engineering & Physics, vol. 30, pp. 123-133.
International Search Report, International Application No. PCT/US2014/032020, dated Aug. 21, 2014, 5 pages.
Bisseling, R. et al., "Handling of Impact Forces in Inverse Dynamics", Journal of Biomechanics, vol. 39, Issue 13, 2006, pp. 2438-2444.

* cited by examiner

PITCHER TRAINING APPARATUS AND METHOD USING A BALL WITH AN EMBEDDED INERTIAL MEASUREMENT UNIT

FIELD

The present disclosure relates to sports training equipment and, more particularly, relates to a pitcher training apparatus and method employing a ball having an embedded inertial measurement unit.

BACKGROUND AND SUMMARY

This section provides background information related to the present disclosure which is not necessarily prior art. This section provides a general summary of the disclosure, and is not a comprehensive disclosure of its full scope or all of its features.

Baseball pitching is one of the most unforgiving positions in sports; one mistake, like a hung curveball or a fastball that tails out over the plate and the result may be a run for the opposing team, or an injury to the pitcher. Because of this, there has been considerable scientific research conducted focusing on: (1) pitch aerodynamics, and (2) pitching mechanics. Despite this and other research, coaches still rely largely on a qualitative assessment of pitching mechanics and outcomes (in the form of radar gun measurements, ball and strike counts, and ERA) for pitcher training.

Studies investigating the effects of aerodynamics on a baseball's flight path consider how the ball's velocity and angular velocity at release causes it to break. Experiments reveal that the total break of the ball during free flight is proportional to the aerodynamic lift coefficient of the ball, is dependent on the seam orientation, and is a function of the magnitude and direction of the ball's angular velocity with respect to the velocity of its mass center. The orientation, spin, and velocity of the ball at release are controlled by pitching mechanics. These quantities ultimately differentiate one pitch type from another. The fastball and change-up possess pure backspin in relation to the velocity. In contrast, the curveball spins about the same axis as the fastball, but in the opposite direction, resulting in pure topspin. The slider is thrown with a combination of top- and side-spin.

Pitching mechanics studies have long relied on position data obtained via high-speed cameras. However, video-based motion capture is expensive, time consuming, and requires an operator skilled in both the collection and analysis of the data. Furthermore, baseball angular velocity is difficult to resolve using video based systems due to marker occlusion while the ball is in the pitcher's hand, and the high angular rate with which baseballs are thrown. For these reasons, using high speed video analysis systems in baseball pitcher training is not a viable option.

The advent of MEMS inertial sensors and MEMS-scale wireless transceivers has enabled an alternative to video-based motion capture. Several studies have explored the use of wireless inertial measurement units (IMUs) for baseball pitcher training. Unfortunately, the size and mass of the IMUs used in these studies (as well as those commercially available from companies like Xsens™) prohibit their use for measuring the motion of a baseball.

The present teachings address these shortcomings by presenting a highly miniaturized wireless IMU that is small and light enough to be embedded within a baseball (FIG. 1). The resulting design yields a low cost, highly portable and minimally intrusive approach for measuring the kinematics of the baseball during the pitching motion. While some ball spin rates remain outside the measurement range of most of today's technology for angular rate gyros, future advances of the present teachings, together with other methods, will allow ubiquitous application of the methods presented herein in the future.

Accordingly, the present teachings disclose a technology and method for calculating the kinematics of a baseball, softball, cricket ball and the like at all instants during a pitch and during the subsequent free flight of the ball using a miniaturized wireless inertial measurement unit embedded in the ball. The kinematical information can be used for training and evaluation purposes as well as a means to understand potential injury mechanisms. For instance, the methods allow one to determine the linear and angular velocity of the ball which define different pitch types and how well these different pitch types are thrown. The kinematical information can include any one of a number of useful parameters generally understood as kinematical information, such as, but not limited to, velocity, angular velocity, orientation, angular acceleration, linear and angular momentum, kinetic energy, position, and the like.

Presently, there is one product currently on the market that provides measurement of ball linear and angular speed. REVFIRE baseballs and softballs use a network of accelerometers embedded inside the ball's cover to deduce angular rate and linear speed. Angular rate is calculated by utilizing a proportional relationship between the g-forces on a spinning ball, measured by the accelerometer network, and the square of its spin rate. Linear speed is calculated by dividing a user entered throw distance by the time between ball release and impact. In essence, this product is able to provide the average magnitude of the angular and linear velocity vectors during ball flight, but not their directions or a full vectoral description of ball center velocity and ball angular velocity (vector-valued quantities). This fact renders the REVFIRE incapable of distinguishing pitch type (and hence training for specific pitch types) for lack of knowing the orientation of the ball angular velocity to the ball center velocity. Furthermore, the REVFIRE is only able to report average values for free-flight, it is unable to provide any information about how the pitcher develops the angular and linear velocity of the ball during the throwing motion. Thus the REVFIRE has far less utility for pitcher training.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 8:
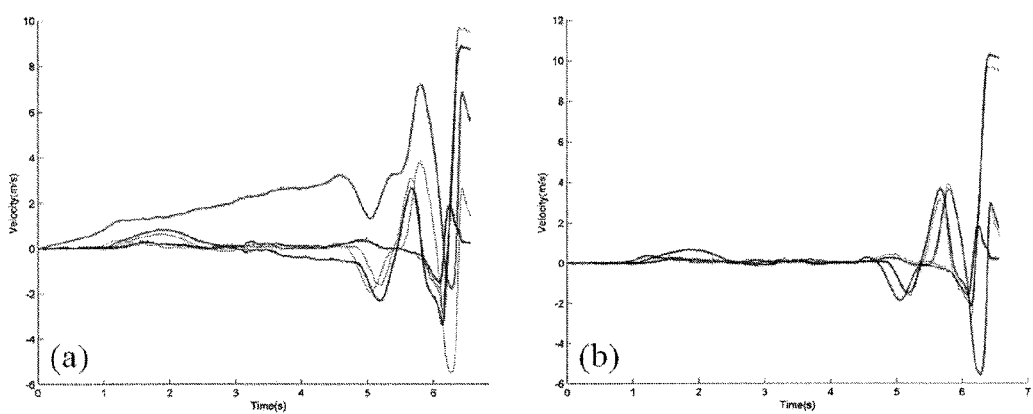

FIG. 8A is a graph illustrating the uncorrected X, Y, and Z-direction components of the velocity vector of the center of the softball as calculated using data from the IMU (thick, dashed) and the VICON motion capture system (thin, solid); and FIG. 8B is a graph illustrating the corrected X, Y, and Z-direction components of the velocity vector of the center of the softball as calculated using data from the IMU (thick, dashed) and the VICON motion capture system (thin, solid).

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the present description will largely reference baseballs and softballs, it should be appreciated that the principles of the present teachings are equally applicable to other moving bodies or projectiles, such as, but not limited to, basketballs, soccer balls, tennis balls, or any sports equipment. Moreover, the principles of the present teachings can further be employed to determine flight parameters of other products or devices, such as falling bodies and the like. The following description should not be regarded as limiting the invention.

Proper pitching mechanics are imperative for developing different types of pitches (e.g., fastball vs. breaking ball) and for preventing injury. Different pitch types are distinguished by the path (i.e. break) and speed of the ball which, in turn, are dictated by the angular velocity of the ball and the velocity of the ball center at the instant of release from the pitcher's hand. While radar guns effectively measure ball speed, they provide no information about the direction of the velocity of the ball center, the angular velocity of the ball, or the way in which these quantities change during the throw. These quantities can, in principle, be calculated using high-speed video-based motion capture (MOCAP), but doing so requires measurements in a controlled lab environment taken by a skilled technician. Moreover, MOCAP is unlikely to accurately resolve the angular velocity of the ball which is crucial to understanding pitching. The present teachings address these shortcomings by presenting an instrumented ball or measurement system 10 containing a miniature, wireless inertial measurement unit (IMU) 12 to measure dynamics of a ball or other member 102 on the field of play. Measurements reveal that this technology can deduce the magnitude and direction of the ball's velocity at release to within 4% when benchmarked against MOCAP. Moreover, the IMU 12 directly measures the angular velocity of the ball 102 for pitches that remain within the measurement range of the associated angular rate gyros.

Figure 1:
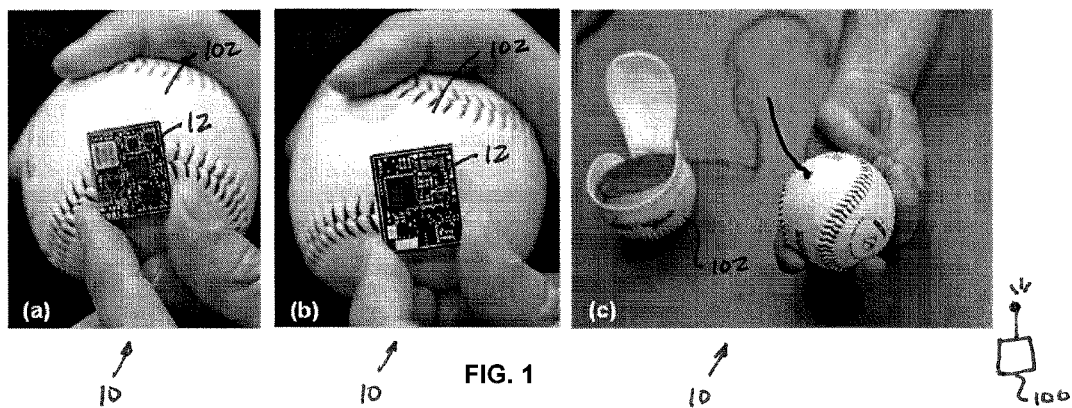
FIG. 1A is a photograph of highly miniaturized, wireless IMU illustrating the analog circuit side according to principles of the present teachings.
FIG. 1B is a photograph of highly miniaturized, wireless IMU illustrating the digital circuit side according to principles of the present teachings.
FIG. 1C is a photograph of highly miniaturized, wireless IMU embedded within a baseball according to principles of the present teachings.

FIGS. 1A-1C illustrate what is believed to be one of the world's smallest wireless IMUs 12 enabling peer-to-peer communication to a host computer 100 from a ball 102 or other product or member. This single-board design follows a lineage of larger, multi-board IMU designs developed at the University of Michigan for novel sports training systems.

In some embodiments of the present teachings, the IMU 12 features a footprint of 19×24 mm, a mass of 4.5 grams including a small lithium-ion battery (80 mWh), and a power draw which remains below 25 mW. The two faces of the design separate analog and digital circuits. The analog circuit side (FIG. 1A) includes a three-axis accelerometer (+/-18 g range), one dual-axis and one single-axis angular rate gyro (+/-2400 deg/s range). The digital circuit side (FIG. 1B) includes a microprocessor which provides 1 kHz sampling of all sensor channels and 12-bit A/D conversion, a low power RF transceiver, and a small surface mount antenna. The low power RF transceiver uses a proprietary RF protocol to transmit over a typical open-air range of 5 m with up to 18 m being achieved in low ambient RF environments. A USB-enabled receiver (not shown) enables data collection on a host computer via custom data collection software.

The IMU 12 above, when embedded in a baseball 102 (FIG. 1C), enables the direct measurement of the rigid body dynamics of the ball 102 in a non-invasive (wireless) mode. This specific application of IMU technology has previously been impossible due to the size and weight of other existing IMU designs. Studies investigating baseball aerodynamics dictate that pitch trajectory is dependent on the velocity of the ball center as well as its orientation and angular velocity at release. Collectively, we refer to the velocity of the ball center, the orientation of the ball, and the angular velocity of the ball at release as the 'release conditions.' A set of experiments were performed to demonstrate that this technology can measure these crucial release conditions as well as the dynamics of the ball before and after release.

Figure 2:
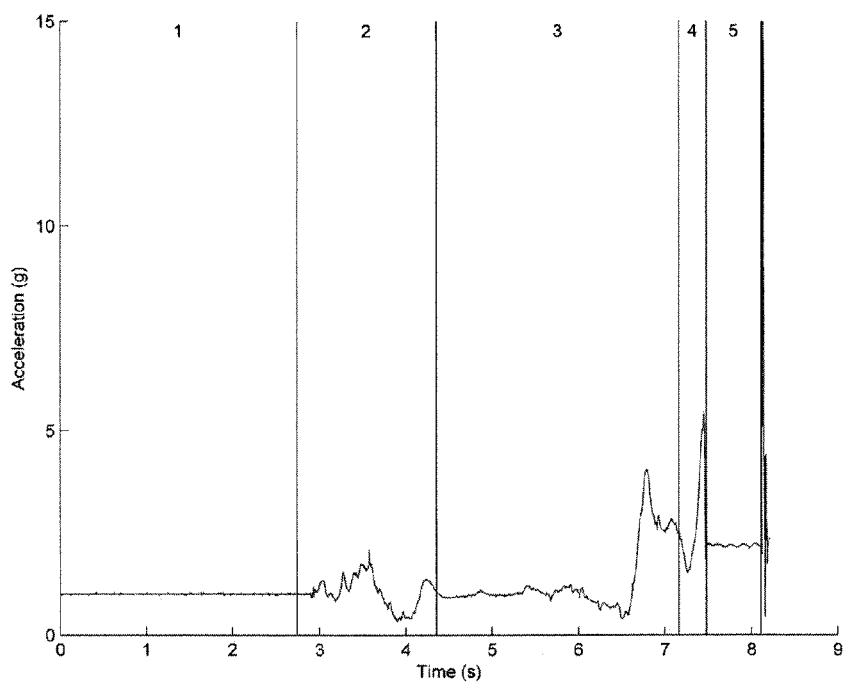
FIG. 2 is a graph illustrating the magnitude of IMU-measured acceleration with 5 important phases of motion indicated for a baseball.

Subjects were instructed to pick the ball 102 off of a tee, come to their set position on the mound, and then throw the ball 102 to the catcher in an otherwise unencumbered manner. This sequence of events is readily identifiable in the magnitude of the measured acceleration plotted against specific phases in FIG. 2.

During Phase 1, the ball 102 is at rest on the tee (acceleration magnitude of 1 g). Phase 2 begins when the subject picks the ball 102 off the tee and ends when the set position is first reached. Phase 3 starts with the pitcher in the set position and ends when his or her arm is fully extended away from the catcher. Phase 4 is then the forward throwing motion starting from the furthest extension position and ending when the ball 102 is released. Finally, Phase 5 extends from ball release to impact; the flight phase of the ball 102's motion. These phases have been confirmed independently using high-speed video (frame rate of 300 Hz.) which was synchronized with the IMU 12 data using a custom Matlab™ program and the instant of ball release as the synchronization event.

Figure 3:
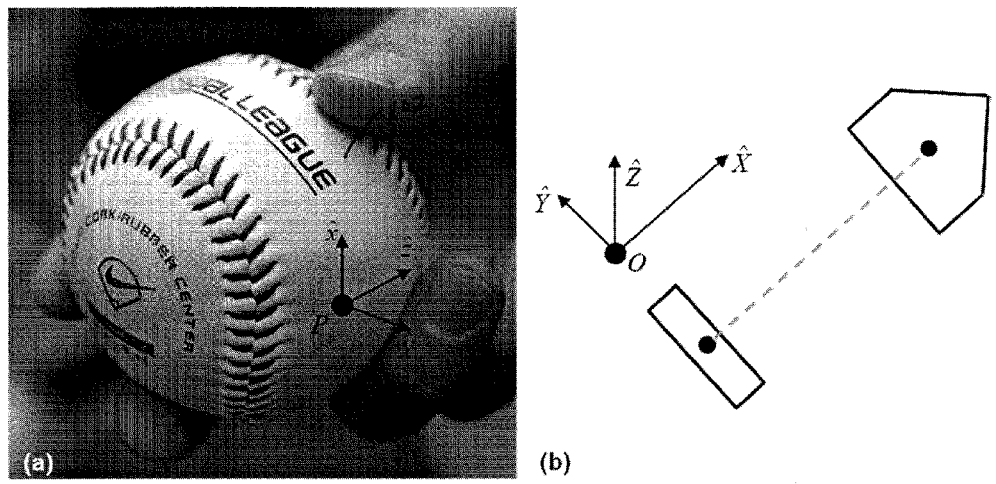
FIG. 3A is a photograph of a baseball incorporating the embedded IMU illustrating ball-reference frame.
FIG. 3B is a schematic of a baseball field illustrating field-fixed reference frame.

The IMU 12 measured angular velocity and acceleration are reported in a moving, "ball-fixed" reference frame denoted by the mutually orthogonal triad of unit vectors $(\hat{x},\hat{y},\hat{z})$ with origin collocated with the center of the IMU 12's accelerometer (point p) as illustrated in FIG. 3A. It's useful to also introduce an inertial, "field-fixed" reference frame which is defined by the mutually orthogonal triad of unit vectors $(\hat{X},\hat{Y},\hat{Z})$, with origin located at the center of ball 102 when in the tee prior to the throw as illustrated in FIG. 3B. The field-fixed frame is defined such that the $\hat{Z}$ axis points vertically upward and the $\hat{X}$ axis points toward home plate parallel to a line connecting the centers of the pitching rubber and home plate. The ball 102 fixed frame of reference is shown in FIG. 3A and the field-fixed frame is shown in FIG. 3B.

The transformation that relates these two frames, the direction cosine matrix (DCM), is then defined in eq. (1).

$$\vec{x}|_{\hat{X},\hat{Y},\hat{Z}} = \Lambda \vec{x}|_{\hat{x},\hat{y},\hat{z}} \tag{1}$$

where $\Lambda$ is the direction cosine matrix, $\vec{x}|_{\hat{x},\hat{y},\hat{z}}$ is vector $\vec{x}$ resolved in the ball 102 fixed frame, and $\vec{x}|_{\hat{X},\hat{Y},\hat{Z}}$ is vector $\vec{x}$ resolved in the field-fixed frame. As defined, the ball 102 fixed frame is translating and rotating with respect to the field-fixed frame. The DCM can be computed from the angular velocity of the ball 102, and is determined according to an adaptation of the integration method described in [provide reference that we gave in our description] given its initial value. The method for constructing the DCM as a function of time is based on a numerical solution to the differential equation governing the evolution of the DCM as shown in eq. (2).

$$\dot{\Lambda} = \Lambda \vec{\omega} \tag{2}$$

where $\dot{\Lambda}$ is the time derivative of the DCM and $\vec{\omega}$ is the ball 102 fixed angular velocity in skew-symmetric form. The midpoint solution method can be rearranged to solve for the DCM at time step n+1 in terms of the DCM at time step n, and the ball 102 fixed angular velocity vector at time steps n and n+1. This explicit relationship is shown in eq. (3).

$$\Lambda_{n+1} = \Lambda_n \left[I + \frac{1}{2}\hat{\theta}\right]\left[I - \frac{1}{2}\hat{\theta}\right]^{-1} \tag{3}$$

where $\vec{\theta}$ is the midpoint approximation of the change in orientation from time steps n to n+1, as defined in eq. (4), in skew-symmetric form.

$$\vec{\theta} = \frac{1}{2}\Delta t(\vec{\omega}_{n+1} + \vec{\omega}_n) \tag{4}$$

where $\vec{\omega}_{n+1}$ and $\vec{\omega}_n$ are the ball 102 fixed angular velocities at time steps n+1 and n respectively, and $\Delta t$ is the change in time between time steps n and n+1. The IMU 12 gives the ball 102 fixed angular velocity needed to solve eq. (3) provided an initial value for the DCM ($\Lambda_0$). The initial value is determined by assessing the measured acceleration of the ball 102 while at rest in the tee at the start of the trial. With this information one can then solve for the DCM as a function of time $\Lambda(t)$.

Armed with this knowledge, one can now determine the ball 102 center velocity during the throw. It's important to remember that the IMU 12 is, in general, not necessarily located at the center of the ball 102. Hence, eq. (5) gives the acceleration of the ball 102's center ($\vec{a}_c$) in terms of the acceleration of the accelerometer ($\vec{a}_p$).

$$\vec{a}_c = \vec{a}_p + \vec{\dot{\omega}} \times \vec{r}_{c/p} + \vec{\omega} \times \vec{\omega} \times \vec{r}_{c/p} \qquad (5)$$

where $\vec{\omega}$ and $\vec{\dot{\omega}}$ are the ball 102 angular velocity and acceleration respectively, and $\vec{r}_{c/p}$ is a vector that describes the position of the ball 102 center with respect to center of the accelerometer. The accelerometers included in this IMU 12 measure the acceleration of point P plus gravity. In other words, the measured acceleration is defined as $\vec{a}_a = \vec{a}_p + g\hat{K}$. Substituting this relation into eq. (5), subtracting off the effect of gravity, and resolving the result in the field-fixed frame yields the expression for the acceleration of the ball 102's center defined in eq. (6)

$$\vec{A}_c(t) = \Lambda(t)[\vec{a}_a(t) + \vec{\dot{\omega}}(t) \times \vec{r}_{c/p} + \vec{\omega}(t) \times \vec{\omega}(t) \times \vec{r}_{c/p}] - g\hat{K} \qquad (6)$$

which can be integrated to form the ball 102 center velocity $$\vec{V}_c(t) = \int_0^t \vec{A}_c(\tau) d\tau, \qquad (7)$$

where $$\vec{V}_c(0) = 0$$

Integration of eq. (7) also provides the position of the ball center.

It is well established that measurement noise and sensor drift significantly affect the accuracy of the integrated results above. Thus, corrections must be applied. For example, we are able to improve the accuracy of the velocity by making use of a priori knowledge of the ball 102 kinematics to identify drift errors, and then subsequently account for them in the calculation of the ball 102 COM velocity by subtracting a best-fit error polynomial from the result of eq. (7). Table 1 summarizes the example kinematic constraints used to identify drift error.

TABLE 1

Kinematic constraints used to correct drift errors in ball-center velocity calculation

| $\hat{X}$ | $\hat{Y}$ | $\hat{Z}$ |
|---|---|---|
| $V_x = 0$ start Phase 1 | $V_y = 0$ start Phase 1 | $V_z = 0$ start Phase 1 |
| $V_x = 0$ end Phase 1 | $V_y = 0$ end Phase 1 | $V_z = 0$ end Phase 1 |
| $V_x = 0$ end Phase 3 | $V_y = 0$ end Phase 4 | $P_z =$ measured end Phase 2 |
| $V_x = \Delta x_5 / \Delta t_5$ end Phase 4 | $\Delta V_{x,5} = 0$ | $P_z =$ strike end Phase 5 |
| $\Delta V_{x,5} = a_{drag} \Delta t_5$ | | $\Delta V_{x,5} = a_{gravity} \Delta t_5$ |

To demonstrate the accuracy of the IMU 12 calculated ball velocity, the three-dimensional ball velocity as determined via the aforementioned method is compared to the velocity as determined using a 10-camera high speed motion analysis system (VICON) calibrated such that marker errors for all ten cameras were less than 0.250 mm. The baseball, with embedded IMU, was completely coated in reflective tape and its 3-D position was measured by the VICON system at a frequency of 100 Hz. The ball 102's position data was smoothed using a 6-point moving average technique and then differentiated to determine the ball 102's velocity to minimize the effect of measurement noise on the calculation.

Figure 4:
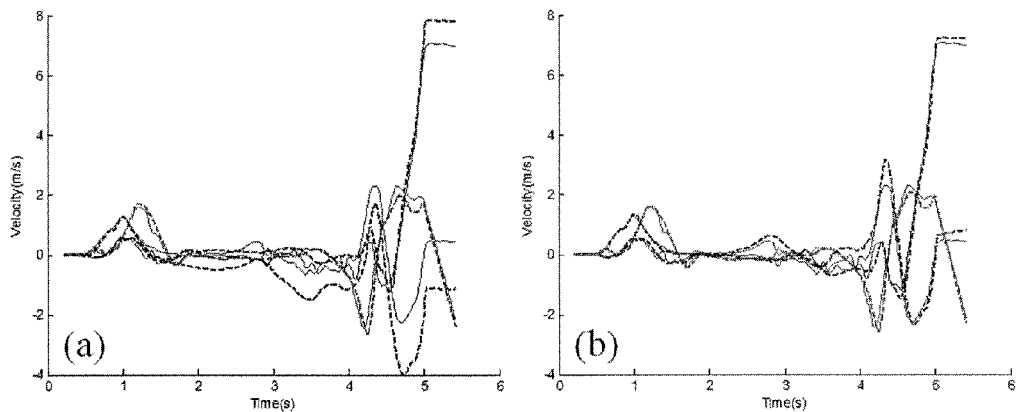
FIG. 4A is a graph illustrating the uncorrected X, Y, and Z-direction components of the velocity vector of the ball center as calculated using data from the IMU (thick, dashed) and the VICON motion capture system (thin, solid)
FIG. 4B is a graph illustrating the corrected X, Y, and Z-direction velocity components of the ball center as calculated using data from the IMU (thick, dashed) and the VICON motion capture system (thin, solid)

The drift associated with raw integration of IMU data is illustrated nicely by FIG. 4A which shows the uncorrected velocity of the center of ball 102. The curves represent the velocity components in the $\hat{Z}$, $\hat{Y}$, and $\hat{X}$ directions. The solid curves are the velocities as determined by the VICON system and the dashed curves are those determined using IMU data from the present teachings.

It is clear from FIG. 4A that the error between the VICON and IMU velocities increases with time for the velocity components along the $\hat{X}$ and $\hat{Y}$ axes, while the drift in the $\hat{Z}$ component is quite modest. In contrast, FIG. 4B illustrates the velocity components after the drift correction algorithm has been applied. Visually, the IMU 12 data, in combination with the example drift correction algorithm produces velocity components for the ball 102's center which are accurate relative to those determined by the VICON system. To quantify the difference between the two (IMU-based versus mocap-based predictions of the velocity components), a normalized RMS difference is defined in eq. (8).

$$\varepsilon_{cj} = \frac{\sqrt{(1/N)\sum_{i=1}^{N}\left(V_{cj,i} - \tilde{V}_{cj,i}\right)^2}}{|\text{MAX}[V_{cj}(i \le i_{release})]|}, \qquad (8)$$

where $$j = x, y, z$$

where $V$ and $\tilde{V}$ are the VICON and IMU derived velocity components respectively. The numerator of this error measure is the RMS of the difference between the velocities. The denominator is a normalizing factor which is defined as the absolute value of the maximum velocity in the j direction achieved by the ball 102 while still in the pitcher's hand as determined from the VICON data. The resulting errors for a 5-sample set of throwing data are summarized in Table 2.

TABLE 2

Normalized RMS error in IMU velocity components as compared to motion capture data

| Error Component | Maximum (%) | Minimum (%) | 5-Trial Mean (%) |
|---|---|---|---|
| $\epsilon_{cx}$ | 3.0 | 2.1 | 2.5 |
| $\epsilon_{cy}$ | 12.6 | 8.7 | 10.0 |
| $\epsilon_{cz}$ | 10.6 | 5.7 | 7.7 |

An average error less than or equal to 10% can easily be due to noise and other errors commonly associated with video-based motion capture technology. If we then focus on the ability for this technology to accurately identify pitch type, we must inspect the accuracy of the release velocity prediction. To this end, a release velocity error measure is defined in eq. (9).

$$\varepsilon_{cj,rel} = \sqrt{\frac{\left(V_{cj,rel} - \tilde{V}_{cj,rel}\right)^2}{V_{cj,rel}^2}}, \qquad (9)$$

where $$j = x, y, z$$

where V and $\tilde{V}$ are the VICON and IMU derived velocity components at release respectively. The resulting errors for the same 5-sample set of throwing data are summarized in Table 3.

TABLE 3

Percent error in IMU velocity components at release as compared to motion capture data

| Error Component | Maximum (%) | Minimum (%) | 5-Trial Mean (%) |
| --- | --- | --- | --- |
| $\epsilon_{cx,rel}$ | 6.2 | 0.1 | 3.5 |
| $\epsilon_{cy,rel}$ | 5.1 | 0.1 | 1.9 |
| $\epsilon_{cz,rel}$ | 9.8 | 0.4 | 4.0 |

Thus, the IMU 12 instrumented baseball 102 is able to identify the release conditions of a pitch by direct measurement of the angular velocity and by calculation of the linear velocity and ball orientation, and that these computed quantities remain within 4% of those measured using MOCAP. Having determined these outputs of the pitching motion, one is able to predict the type of pitch being thrown as evidenced by the results in FIGS. 5A-5D.

Figure 5:
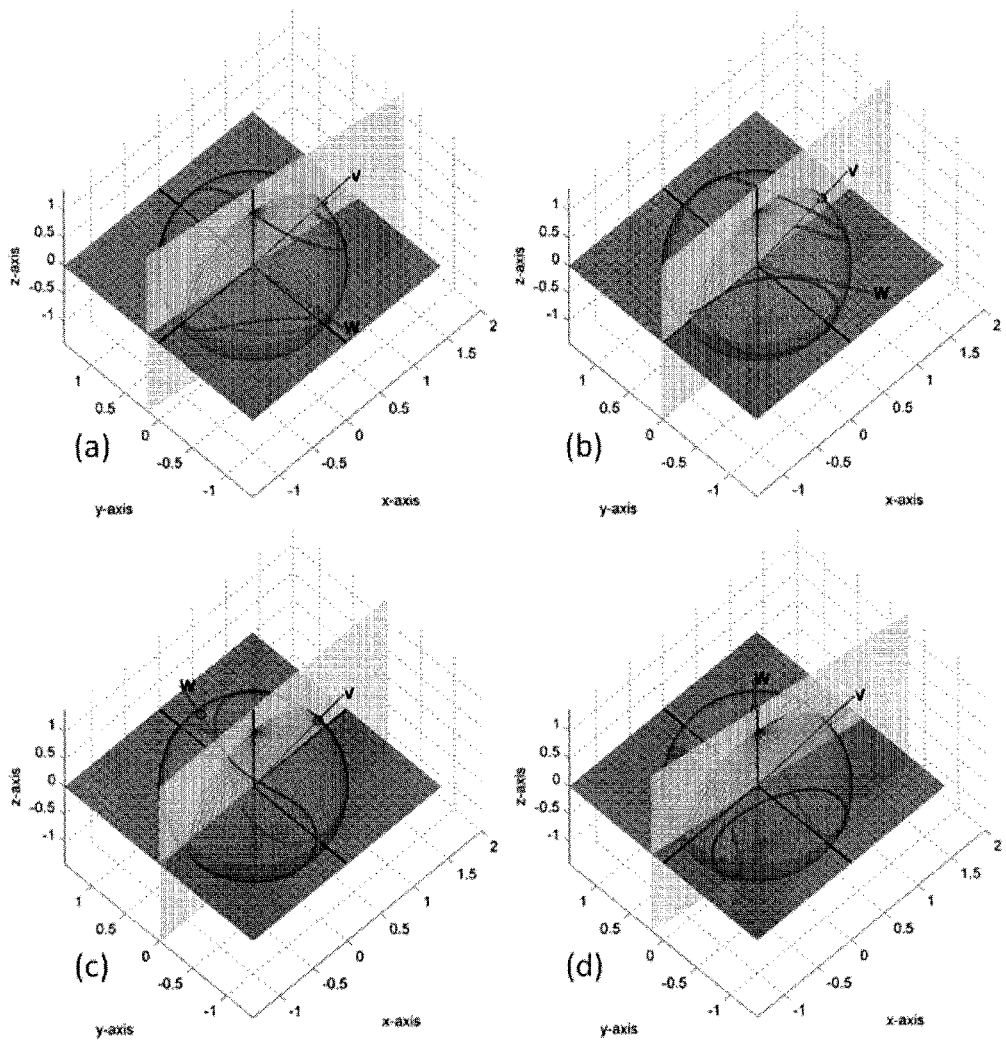
FIGS. 5A-5D illustrate the IMU-determined angular velocity vector (w), ball center velocity vector (v), and ball orientation at release for a fastball (a), change-up (b), curveball (c), and slider (d)

The images of baseball release conditions reported in FIG. 5, for pitches thrown with modest linear and angular speed, confirm expected trends. FIGS. 5A & 5B illustrate the release conditions for a fastball and change-up, respectively. These two pitches are thrown largely with backspin which will cause an aerodynamic lift force. Additionally, a small amount of lateral break develops due to the small side spin components of the angular velocity. In contrast, FIG. 5C shows that a curveball is released with largely top spin, and the resulting aerodynamic force accelerates the ball 102 downwards. Like the fastball and change-up, small side-spin components create additional but small lateral break. Finally, FIG. 5D shows the release conditions for a slider which has largely side spin, but also a small top spin component. The side spin induces a large lateral break, while the topspin induces a small drop. The position of the spin axis of the ball 102 relative to the velocity of the ball 102 center at release provides the essential information needed to evaluate whether the desired type of pitch is thrown correctly, to what degree the pitcher achieves that type of pitch, and also how consistently it is thrown. Collectively, these measurements provide powerful information for evaluating pitching performance.

The technology presented in the present teachings enables a low cost, highly portable and minimally intrusive approach for pitcher training. It has be shown that the IMU 12 embedded baseball 102 is able to reproduce the magnitude and direction of the release velocity of the ball 102 to within 4% and the entire velocity time history to within 10% of the motion-capture-determined values, while the angular velocity of the ball 102 at release is directly measured. This information allows the identification and assessment of various pitch types (FIG. 5), providing the visual, quantitative and accurate feedback that is needed by pitching coaches and players for pitching training and performance evaluation.

Evidence Supporting Use for Softball

Figure 6:
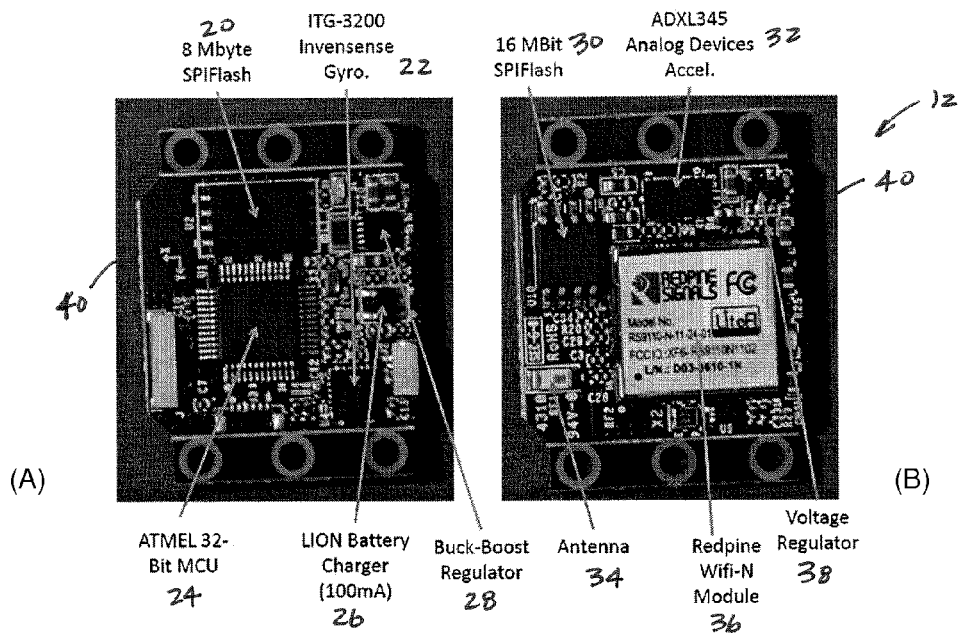
FIGS. 6A-6B are photographs of a second IMU according to principles of the present teachings.

FIG. 6 illustrates a more recent IMU 12 developed at the University of Michigan for sports training and biomechanical applications. Important components are labeled in the figure. In some embodiments, this can comprise an SPIFlash 20 (8 Mbyte), a gyro 22 (ITG-3200 Invensense Gyro), a micro controller unit 24 (MCU)(ATMEL 32-bit MCU), a power source 26 (LiOn battery charger (100 mA)), a buck boost regulator 28, an SPIFlash 30 (16 Mbit), an accelerometer 32 (ADXL345 Analog Devices Accelerometer), an antenna 34, a wireless module 36 (Redpine WIFI-N module), and a voltage regulator 38 mounted on a substrate 40 (perhaps opposing sides thereof). It should be appreciated that alternative components (or additional or fewer components) may be used. Moreover, in some embodiments, the power source can be recharged via a wired connection or wirelessly through inductive charging.

This design enables synchronous data collection from up to 8 IMUs over a standard wi-fi network. The design includes a digital tri-axial angular rate gyro 22 and a digital tri-axial accelerometer 32, which perform internal 16-bit and 13-bit A/D conversion with measurement ranges of 2000 deg/s and 16 g, and sampling frequencies up to 512 and 800 Hz respectively. Additionally, the design includes 8 Mbytes of flash memory 20 enabling onboard data storage during a data collection trial and downloaded to the host computer after its completion. The board 40, battery, and switch are packaged in a robust plastic box that measures 40×40×20 mm with mass of 25 g.

Figure 7:
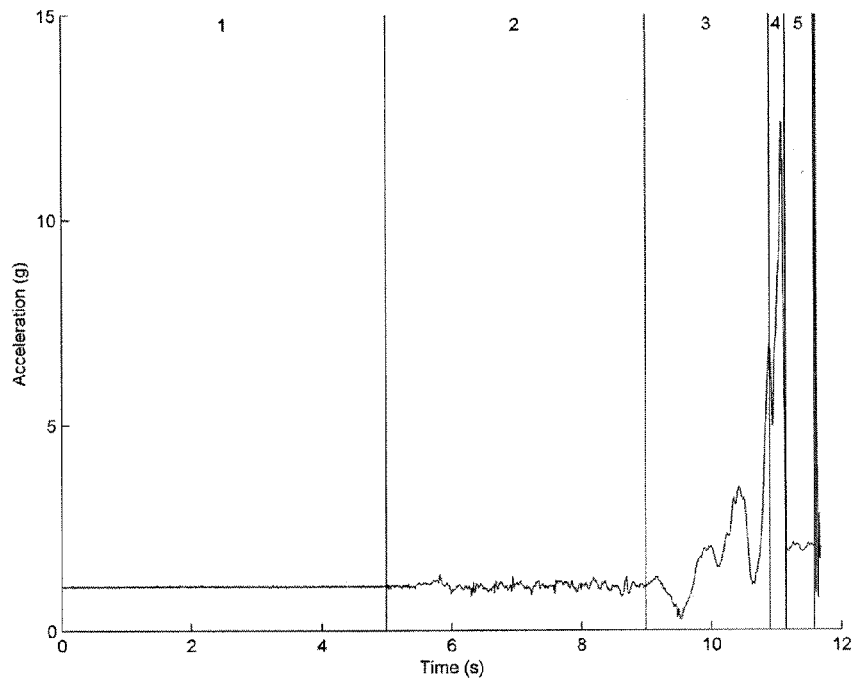
FIG. 7 is a graph illustrating the magnitude of IMU-measured acceleration with 5 important phases of motion indicated for a pitched softball.

A plastic box or other protective housing may be used to contain the IMU, battery, and switch, and can be is embedded in a regulation softball enabling the measurement of its dynamics during the throw. Like with the baseball above, each pitcher is instructed to pick the ball 102 off of a tee, come to the set position, and then pitch the ball 102 to the catcher in an otherwise unencumbered manner. The magnitude of the measured acceleration is shown plotted against important phases of the motion in FIG. 7.

Phase 1 corresponds to the time where the ball 102 is in the tee prior to the throw. Phase 2 extends from the time where the pitcher picks the ball 102 off of the tee to the instant before she begins her windup. Phase 3 begins at the start of the windup and extends to the instant in time where the pitcher's arm is furthest extended away from the catcher directly following the arm looping maneuver just before release. Phase 4 extends from the end of Phase 3 to release. Finally, Phase 5 is when the ball 102 is in free flight. Given the measured acceleration and angular velocity from the embedded IMU, the same theory presented above for the baseball allows one to determine the ball 102 center velocity at all instants during the throwing motion and resulting ball flight. At specific points during each of the 5 throw phases, the kinematics of ball are known a priori in at least one of the three field-fixed reference directions. This knowledge, when coupled with pitcher-specific position measurements, enables one to identify the drift that arises from the ball 102 center velocity calculation. The example constraints used to identify drift are identical to the ones used for the baseball, which are summarized in Table 1 above.

To demonstrate the accuracy of the IMU 12 calculated ball velocity, the three-dimensional ball velocity as determined from IMU measurements is again compared to the velocity as determined using a 10-camera high speed motion analysis system (VICON) calibrated such that marker errors for all ten cameras were less than 0.250 mm. The softball, with embedded IMU, was completely coated in reflective tape and its 3-D position was measured by the VICON system at a frequency of 100 Hz. The ball 102's position data was smoothed using a 6-point moving average technique and then differentiated to determine the ball 102's velocity to minimize the effect of measurement noise on the calculation.

Using the same theory described for baseball, one is able to correct the drift-affected velocity of the softball and therefore determine the velocity of the ball 102 at every instant during the pitch. The uncorrected and corrected ball center velocities are shown in FIGS. 8A and 8B, respectively. The curves represent the velocity components in the $\hat{Z}$, $\hat{Y}$, and $\hat{X}$ directions. The solid curves are the velocities as determined by the VICON system and the dashed curves are those determined using IMU data.

FIG. 8A clearly indicates the drift typically associated with the calculation of velocity from IMU-measured acceleration data. The $\hat{Z}$ component has a strong, time-dependent increase in error when compared to the VICON derived ball velocity. The $\hat{X}$ and $\hat{Y}$ components show more modest, though non-trivial drift errors as well. In contrast, FIG. 8B demonstrates that the example drift correction algorithm is capable of identifying and removing the errors due to drift. The same error metric introduced in eq. (8) is again used to quantify the difference between the IMU- and VICON-derived ball center velocity. Table 3 reports a summary of the errors for a 9-trial set of sample softball pitch data.

TABLE 3

Relative error between IMU and VICON ball velocity data for a 9-trial set of sample softball data.

| Error Component | Maximum (%) | Minimum (%) | 9-Trial Mean (%) |
|---|---|---|---|
| $\epsilon_{cx}$ | 3.4 | 1.0 | 2.3 |
| $\epsilon_{cy}$ | 13.7 | 3.9 | 7.4 |
| $\epsilon_{cz}$ | 5.4 | 2.6 | 3.9 |

The table shows that on average there is less than a 7.4% error between IMU and VICON velocity data on a component basis. As with the baseball, when characterizing pitch types and their consistency, it is important to be able to accurately identify the ball 102 velocity at release. Using the error metric defined in eq. (9), Table 4 reports the percent error in IMU-derived ball velocity at release as compared to the VICON data.

TABLE 4

Percent error in IMU-derived ball velocity at release as compared to VICON data.

| Error Component | Maximum (%) | Minimum (%) | 5-Trial Mean (%) |
|---|---|---|---|
| $\epsilon_{cx,rel}$ | 8.3 | 0.5 | 4.6 |
| $\epsilon_{cy,rel}$ | 2.5 | 0.3 | 1.0 |
| $\epsilon_{cz,rel}$ | 5.3 | 0.5 | 2.7 |

These results show that one is able to deduce the release velocity of the softball to within 4.6% of the VICON value while also directly measuring ball angular velocity. This then enables one to characterize pitch types as was done with the baseball.

The technology presented herein provides a low cost, highly portable and minimally intrusive measurement system to support pitcher training. The IMU 12 embedded baseball faithfully reproduces the release velocity of the ball 102 to within 4% relative to that measured by the motion-capture and also provides a direct measurement of the angular velocity of the ball 102 at release. The velocity and angular velocity at release enables one to easily distinguish pitch types and the degree to which that pitch type was thrown. This quick visual, quantitative feedback will enable pitching coaches to accurately evaluate and thereby improve pitching performance.

Possible modifications are largely constrained to the type of measurement sensors being used. The wireless inertial measurement units described above can include one or more MEMS device that include accelerometers and angular rate gyros which provide three-axis sensing of acceleration and angular velocity, respectively. The designs could be extended to provide three-axis sensing of orientation by exploiting the magnetic field detection of MEMS-scale magnetometers, or larger measurement ranges for acceleration and angular velocity. While magnetometers are attractive since they provide orientation data, they are also not required in this application because accurate orientation data can be obtained via integration of the rate gyro data for the relatively short time durations over which baseball and softball pitches occur. Extending the measurement range for acceleration and for angular velocity can be achieved through selection of existing and future high-range accelerometers and angular rate gyros.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A measurement system for transmitting select kinematic variables of a thrown ball, said ball having a ball center, said measurement system comprising:
   an inertial measurement unit connectable with the ball, said inertial measurement unit measuring an acceleration of the thrown ball and an angular velocity of the thrown ball and outputting acceleration data and angular velocity data of the thrown ball in a first, second, and third coordinate direction; and
   a processing unit receiving said acceleration data and said angular velocity data for said first, second, and third coordinate directions and computing release conditions of the thrown ball at the instant the ball is released, said computed release conditions including a velocity of the ball center along said first, second, and third coordinate directions, a ball spin axis along said first, second, and third coordinate directions, and a ball spin rate.

2. The measurement system according to claim 1, further comprising:
   a display device displaying at least one of said computed release conditions.

3. The measurement system according to claim 1, further comprising:
   an output device outputting said acceleration data and said angular velocity data for said first, second, and third coordinate directions from said inertial measurement unit to said processing unit.

4. The measurement system according to claim 1, further comprising:
   an output device outputting said computed release conditions.

5. The measurement system according to claim 1, further comprising:
   an output device wirelessly connected between said inertial measurement unit and said processing unit.

6. The measurement system according to claim 1, further comprising:
   an output device wirelessly connected to said processing unit.

7. The measurement system according to claim 6 wherein said output device comprises an RF transceiver wirelessly connected with said processing unit.

8. The measurement system according to claim 1 wherein said inertial measurement unit is mountable within an interior of the ball.

9. The measurement system according to claim 1 wherein said inertial measurement unit further comprises a memory device storing at least one of said acceleration data, said angular velocity data, and said computed release conditions for delayed transmission.

10. The measurement system according to claim 1 wherein said inertial measurement unit further comprises:
   a power source;
   a microprocessor sampling at least one of a multi-axis accelerometer, a dual-axis angular rate gyro, and a single-axis angular rate gyro at a predetermined interval; and
   an antenna.

11. The measurement system according to claim 10 wherein said power source is an inductive power source.

12. The measurement system according to claim 1 wherein said processing unit determines said computed release conditions using numerical integration methods of said acceleration data and said angular velocity data.

13. The measurement system according to claim 1 wherein said computed release conditions further include an orientation of the ball, an acceleration of the ball center along said first, second, and third coordinate directions, and an angular acceleration along said first, second, and third coordinate directions.

14. The measurement system according to claim 1 wherein said processing unit receiving said acceleration data and said angular velocity data for said first, second, and third coordinate directions further computes prerelease conditions prior to said release of the ball, said computed prerelease conditions including at least one of:
   an acceleration of the ball center along said first, second, and third coordinate directions;
   a velocity of the ball center along said first, second, and third coordinate directions;
   a ball spin axis along said first, second, and third coordinate directions;
   a ball spin rate;
   an angular acceleration along said first, second, and third coordinate directions;
   a position of the ball center along said first, second, and third coordinate directions; and
   a time duration prior to said release of the ball.

15. The measurement system according to claim 1 wherein said processing unit receiving said acceleration data and said angular velocity data for said first, second, and third coordinate directions further computes post-release conditions following said instant the ball is released and characterized by free flight of the ball, said computed post-release conditions including at least one of:
   an acceleration of the ball center along said first, second, and third coordinate directions;
   a velocity of the ball center along said first, second, and third coordinate directions;
   a ball spin axis along said first, second, and third coordinate directions;
   a ball spin rate;
   an angular acceleration along said first, second, and third coordinate directions;
   a trajectory of the ball center;
   a ball break defined by said trajectory of the ball center; and
   a time duration following said release of the ball.

16. The measurement system according to claim 1 wherein said processing unit further computes said release conditions of the thrown ball based on known kinematic constraints on the motion of the thrown ball to correct for drift error in said velocity of the ball center along said first, second, and third coordinate directions.

17. The measurement system according to claim 1 wherein said processing unit receiving said acceleration data and said angular velocity data for said first, second, and third coordinate directions further computes prerelease conditions prior to said release of the ball, said computed prerelease conditions being corrected for error based on known kinematic constraints, said known kinematic constraints including at least one of:
   enforcing that the ball is at rest at known times,
   enforcing a known position of the ball at predetermined times,
   requiring that said velocity of the ball center is consistent with an average velocity of the ball center as measured by ball flight time and distance, and
   enforcing that changes in said velocity is consistent with known forces acting on the ball including at least one of gravity and drag.

18. The measurement system according to claim 1 wherein said processing unit receiving said acceleration data and said angular velocity data for said first, second, and third coordinate directions further computes post-release conditions following said instant the ball is released and characterized by free flight of the ball, said computed post-release conditions being corrected for error based on known kinematic constraints, said known kinematic constraints including at least one of:
   enforcing that the ball is at rest at known times,
   enforcing a known position of the ball at predetermined times,
   requiring that said velocity of the ball center is consistent with an average velocity of the ball center as measured by ball flight time and distance, and
   enforcing that changes in said velocity is consistent with known forces acting on the ball including at least one of gravity and drag.

* * * * *